(12) United States Patent
Fukumoto et al.

(10) Patent No.: US 8,282,413 B2
(45) Date of Patent: Oct. 9, 2012

(54) CONNECTING STRUCTURE OF TERMINALS

(75) Inventors: Masaaki Fukumoto, Anjo (JP); Hitoshi Suzuki, Anjo (JP); Syuji Yoshikawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 39 days.

(21) Appl. No.: 13/082,989

(22) Filed: Apr. 8, 2011

(65) Prior Publication Data
US 2011/0250780 A1   Oct. 13, 2011

(30) Foreign Application Priority Data

Apr. 13, 2010  (JP) .................. 2010-092113

(51) Int. Cl.
*H01R 3/00* (2006.01)

(52) U.S. Cl. ........................................ 439/500

(58) Field of Classification Search ............. 439/500, 439/929, 374, 682, 825; 320/150, 429, 114, 320/106, 107; 429/120, 148, 72, 97, 10, 429/62; 173/217
See application file for complete search history.

(56) References Cited

U.S. PATENT DOCUMENTS
6,350,149 B1   2/2002 Nakane

FOREIGN PATENT DOCUMENTS
JP    A-2001-57204    2/2001

*Primary Examiner* — Alexander Gilman
(74) *Attorney, Agent, or Firm* — Oliff & Berridge, PLC

(57) ABSTRACT

A connecting terminal structure allows providing additional terminals without an increase in the width of a battery pack and an electric apparatus. In a connecting terminal structure according to the present invention, a battery pack is provided with a plurality of terminals having different functions arranged in a sliding direction, and an electric apparatus is provided with a terminal to be connected to one of the plurality of terminals of the battery pack. Through relative sliding between the battery pack and the electric apparatus, before the terminal in the electric apparatus reaches the terminal in the battery pack, the terminal in the electric apparatus can pass through another terminal in the battery pack.

16 Claims, 12 Drawing Sheets

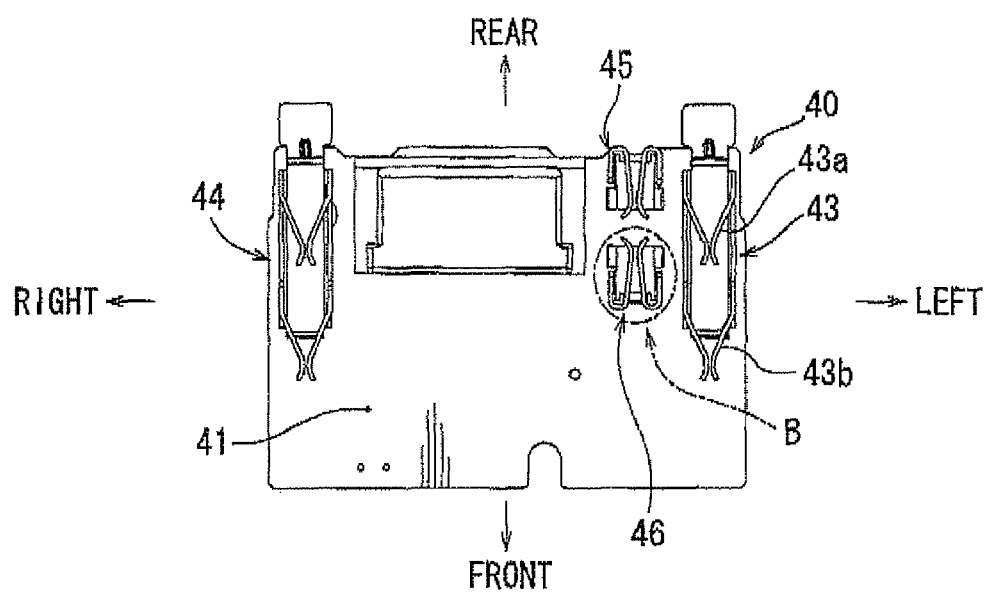
FIG. 6 (A)
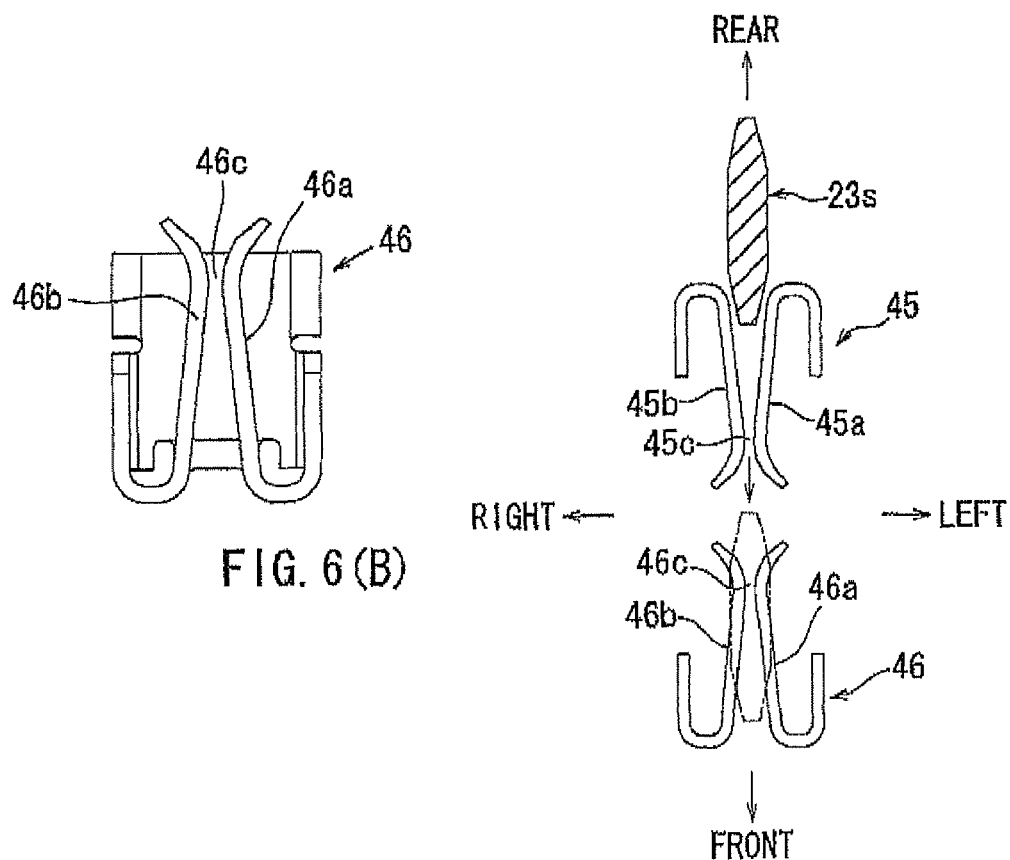
FIG. 6 (B)
FIG. 6 (C)

CONNECTING STRUCTURE OF TERMINALS

This application claims priority to Japanese patent application serial number 2010-92113, the contents of which are incorporated herein by reference.

BACKGROUND OF THE INVENTION

1. Field of the Invention

The present invention relates to a connecting terminal structure in which a tool battery (hereinafter termed "a battery pack") and an electric apparatus are allowed to make a sliding movement relative to each other in a given direction, whereby the battery pack and the electric apparatus are connected with each other, and, further, terminals of the battery pack and those of the electric apparatus are electrically connected to each other.

2. Description of the Related Art

Japanese Patent Application Laid-Open No, 2001-057204 (Japanese Patent No. 3698296) discloses a relevant connecting terminal structure.

As shown in FIG. 12, in the connecting terminal structure of Japanese Patent Application Laid-Open No, 2001-057204, a terminal portion of a battery pack 100 and a terminal portion of an electric power tool main body 110 are connected with each other.

The terminal portion of the electric power tool main body 110 is provided with a negative male terminal 111 on the right end side and a positive male terminal 112 provided on the left end side, with a signal male terminal 115 provided between the terminals 111 and 112. The negative male terminal 111 and the positive male terminal 112 are formed in the form of a band plate extending in the direction in which the battery pack 100 slides, and the size of the terminals 111 and 112 are set to have an equal length. The signal male terminal 115 is formed in the form of a band plate parallel to the negative male terminal 111 and the positive male terminal 112, and is set to be shorter than the positive and negative male terminal 111 and 112.

The terminal portion of the battery pack 100 is provided with a two-stage type negative female terminal 101a, 101b on the right end side, and a two-stage type positive female terminal 102a, 102b. And, a one-stage type signal female terminal 105 is provided between the negative female terminal 101a, 101b and the positive female terminal 102a, 102b, at a position corresponding to the signal male terminal 115 of the electric power tool main body 110.

In the above configuration, the battery pack 100 and the electric power tool main body 110 are allowed to make a relative sliding movement relative to each other, whereby the male terminals 111, 112, and 115 of the electric power tool main body 110 are respectively inserted into the female terminals 101a/101b, 102a/102b, and 105, thereby electrically connecting the terminals to each other.

In the above connecting terminal configuration, when, for example, signal male terminals are additionally provided between the negative male terminal 111 and the positive mate terminal 112 of the electric power tool main body 110, there is not enough space for the signal terminals under the present situation, and it is common practice to enlarge the interval between the negative male terminal 111 and the positive male terminal 112. Thus, due to the addition of the signal male terminals, the width dimension, of the terminal portion of the electric power tool main body 110 increases, resulting in an increase in the size of the battery connection portion of the electric power tool main body 110. Similarly, the width dimension of the terminal portion of the battery pack 100 also increases, resulting in an increase in the size of the battery pack 100.

Thus, there is a need in the art to additionally provide terminals without an increase in the width of the battery pack and of the electric apparatus.

SUMMARY OF THE INVENTION

According one construction, there is provided a connecting terminal structure in which a battery pack and an electric apparatus are allowed to make a sliding movement relative to each other in a given direction, whereby the battery pack and the electric apparatus are connected with each other, and, further, terminals of the battery pack and those of the electric apparatus are electrically connected to each other, wherein in one member of the battery pack and the electric apparatus, there are arranged in the sliding direction a plurality of terminals of different functions, and in the other member of the battery pack and the electric apparatus, there is provided at least one terminal to be connected to the terminal of the one member, and, through relative sliding between the battery pack and the electric apparatus, a predetermined terminal on the other member reaches a predetermined corresponding terminal on the one member, and, in this process, the predetermined terminal on the other member can pass through another terminal on the one member.

Here, the expression: "a predetermined terminal provided on the other member passes through another terminal on the one member" covers not only a case in which the passing occurs in a mutual contact state but also a case in which the passing occurs in a non-contact state.

According to another construction, it is possible to arrange in the sliding direction a plurality of terminals having different functions in the battery pack and the electric apparatus. Thus, when additionally providing a terminal, there is no need to increase the size of the battery pack and of the electric apparatus perpendicular to the sliding direction, or the width thereof. Thus, it is possible to additionally provide a terminal of a different function without an increase in the width of the battery pack and of the electric apparatus.

According to another construction, the other member of the battery pack and the electric apparatus is provided with a single terminal to be connected to one of the plurality of terminals of the one member, or is provided with a plurality of terminals arranged in the sliding direction that are to be respectively connected to the plurality of terminals.

According to another construction, one of the plurality of terminals arranged in the sliding direction is a terminal for transmitting a battery pack identification signal.

According to another construction, one of the plurality of terminals arranged in the sliding direction is a terminal for supplying charge current, and the other terminals are terminals for transmitting a discharge control signal.

According to another construction, a terminal on the other member of the battery pack and the electric apparatus is a male terminal formed as a flat plate parallel to the sliding direction, with both ends in the sliding direction of the male terminal being beveled into a substantially wedge-like sectional configuration.

In this way, both ends in the sliding direction of the male terminal formed as a flat plate are beveled into a substantially wedge-like sectional configuration, so that the male terminal can be easily inserted and detached into and from the mating female terminal in the course of sliding.

According to another construction, a terminal of one member of the battery pack and the electric apparatus is a female terminal formed so as to hold a male terminal of the other member from both skies, with the opening end portion dimension of the female terminal being set larger than the width of a slit that guides a male terminal of the other member.

Consequently, the male terminal of the other member guided by the slit can be reliably inserted into the female terminal of the one member.

According to the above, it is possible to increase the number of terminals without having to increase the width of the battery pack and of the electric apparatus.

BRIEF DESCRIPTION OF THE DRAWINGS

FIG. 6(A) is a plan view of a terminal portion of the battery pack,

FIG. 6(B) is an enlarged view of portion B of FIG. 6(A).

FIG. 6(C) is a plan view showing a process for connection between a signal male terminal of the electric power tool main body and a charge female terminal of the battery pack, and for connection between the signal male terminal and a discharge control female terminal, of the battery pack.

DETAILED DESCRIPTION OF THE INVENTION

Figure 1A:
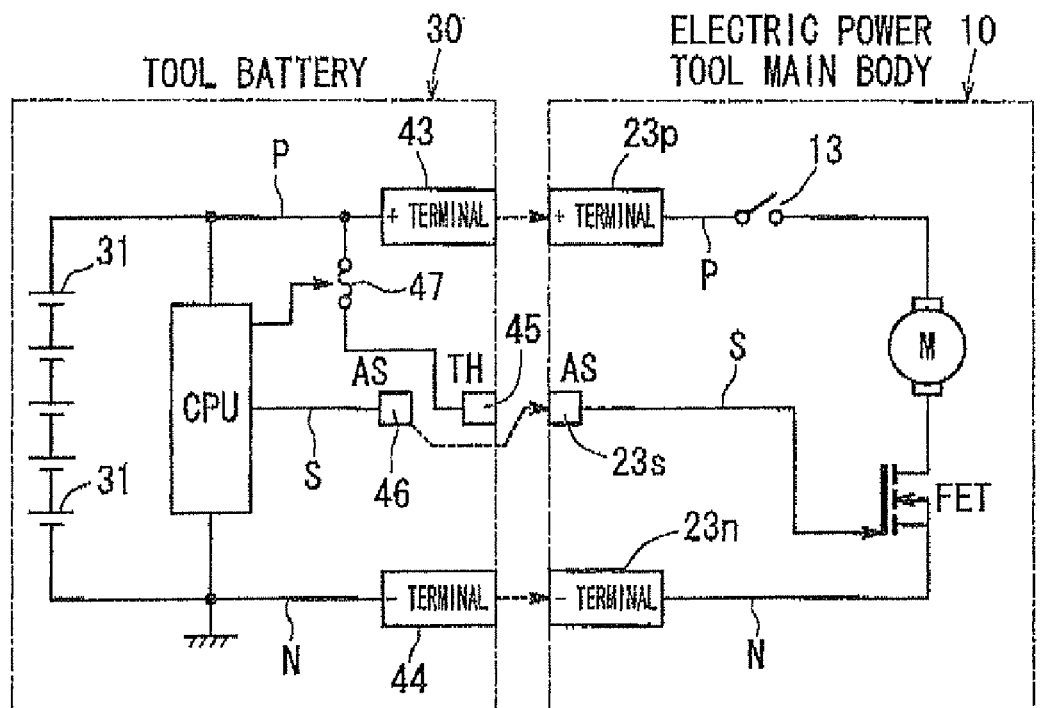
FIG. 1(A) is an electric circuit diagram showing a connecting structure of a battery pack and an electric power tool main body according to embodiment 1 of the present invention.

Each of the additional features and teachings disclosed above and below may be utilized separately or in conjunction with other features and teachings to provide improved connecting terminal structures. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In the following, a connecting terminal structure according to an embodiment 1 of the present invention will be described with reference to FIGS. 1 through 11. The connecting terminal structure of the present embodiment includes a connecting terminal structure for a terminal portion of a battery pack and a terminal portion of an electric power tool main body, and a connecting terminal structure for a terminal portion of the battery pack and a terminal portion of a battery charger.

Here, the front, rear, right, left, upper, and lower sides in the drawings correspond to the front, rear, right, left, upper, and lower sides of the electric power tool main body.

Figure 3:
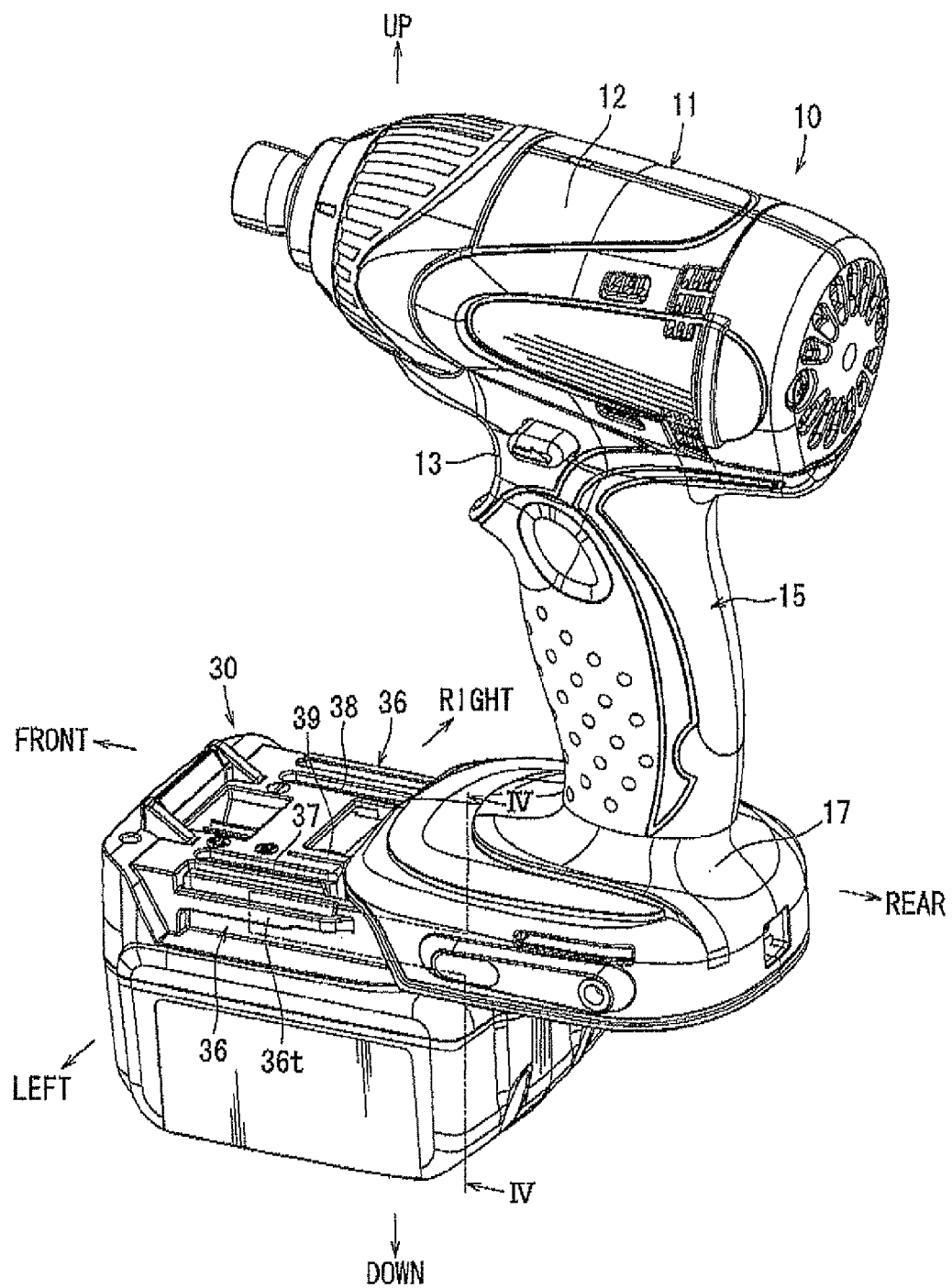
FIG. 3 is a perspective view showing a process for connection between the battery pack and the electric power tool main body.

As shown in FIG. 3, a housing 11 of an electric power tool main body 10 includes a tubular housing main body portion 12 accommodating a motor M (See FIG. 1) etc. and a grip portion 15 formed so as to protrude from the lower portion of the housing main body portion 12. And, at an upper end portion (proximal end portion) of the grip portion 15, there is provided a trigger type switch lever 13. Further, at the lower end portion (distal end portion) of the grip portion 15, there is provided a battery connection portion 17 to which a battery pack 30 is connected.

As shown in FIG. 3, the battery connection portion 17 is configured to be connected to the battery pack 30 through a sliding movement from the rear to the front side with respect to the battery pack 30.

Figure 2A:
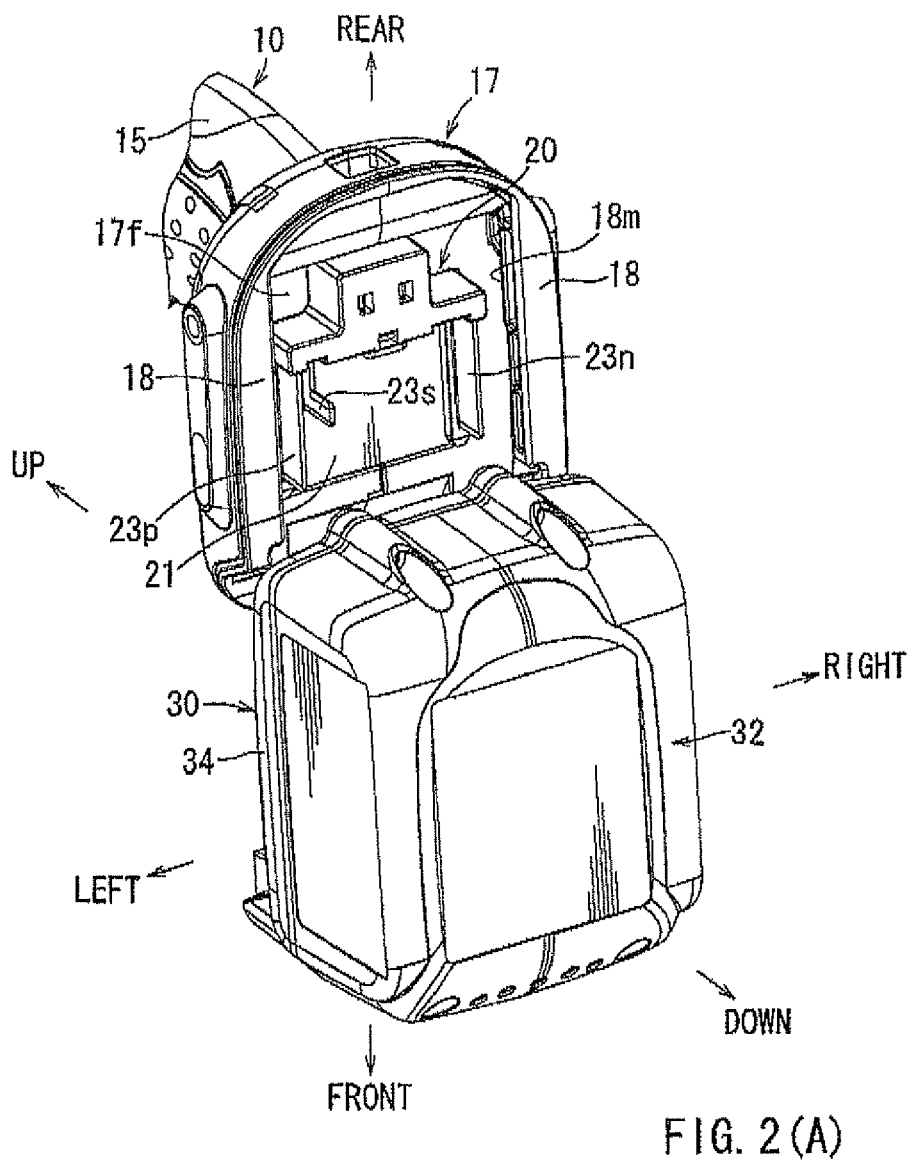
FIG. 2(A) is a perspective view as seen from below of a battery connection portion of the electric power tool main body.
Figure 4:
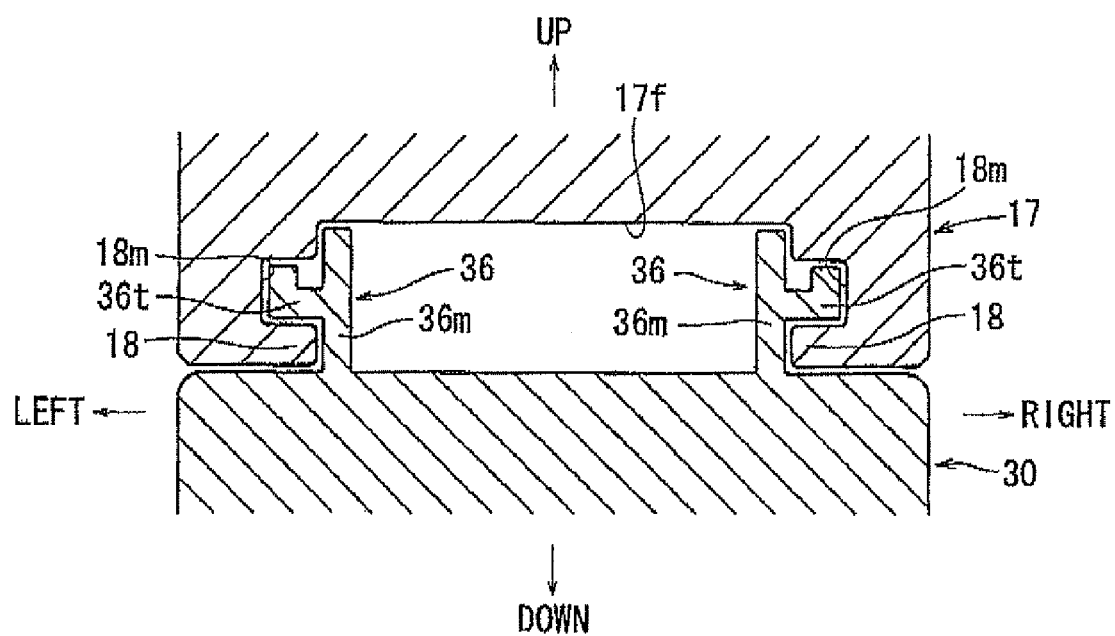
FIG. 4 is a longitudinal sectional view of the connecting structure of the battery pack and the electric power tool main body, which is taken along the arrow line IV-IV of FIG. 3.

As shown in FIG. 2A, the battery connection portion 17 of the electric power tool main body 10 is formed in the form of a substantially rectangular cap whose lower and front sides are open. And, as shown in FIGS. 2A and 4, at a right-hand and left-hand lower end portions of the battery connection portion 17, rail-like ridge portions 18 extending in the sliding direction (the longitudinal direction) of the battery pack 30 are formed so as to protrude inwardly in the width direction from the inner wall surface of the battery connection portion 17. And, as shown in FIG. 4, above the right and left ridge portions 18, there are formed rectangular grooves 18*m* extending in the longitudinal direction along the ridge portions 18. As described below, lateral ridge portions 36*t* of slide rails 36 of the battery pack 30 are fit-engaged with the rectangular grooves 18*m*.

Figure 2B:
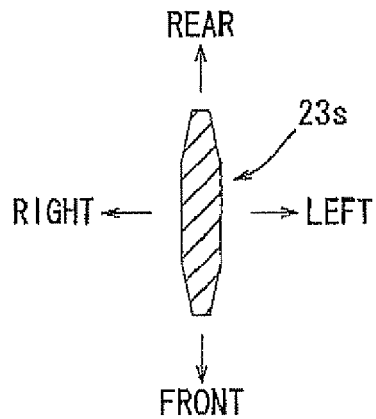
FIG. 2(B) is a plan sectional view of a signal male terminal of the electric power tool main body.

As shown in FIG. 2A, a terminal portion 20 of the electric power tool main body 10 is provided at the central area on the back side of the battery connection portion 17. The terminal portion 20 is a member for fixing a positive male terminal 23p, a negative male terminal 23n, and a signal male terminal 23s at predetermined positions on a lower end surface 17f of the battery connection portion 17. The terminal portion 20 is provided with a flat plate portion 21 fixed to the lower end surface 17f of the battery connection portion 17, and the positive male terminal 23p, the negative male terminal 23n, and the signal male terminal 23s are fixed to the lower surface of the flat plate portion 21 in an exposed condition. The positive male terminal 23p and the negative male terminal 23n are formed in the form of a band plate so as to extend in the sliding direction of the battery pack 30 at the positions of the right and left ends of the flat plate portion 21, and both the terminals stand at substantially right angles with respect to the lower surface of the flat plate portion 21. Further, the positive male terminal 23p and the negative male terminal 23n have the same length. The signal male terminal 23s is formed in the form of a plate parallel to the negative male terminal 23n and the positive male terminal 23p, and is arranged at a predetermined position between the negative male terminal 23n and the positive male terminal 23p. As shown in FIG. 2B, both sides in the sliding direction of the signal male terminal 23s is beveled into a substantially wedge-like sectional configuration.

As shown in FIG. 1A, the positive male terminal 23p of the terminal portion 20 of the electric power tool main body 10 is connected to the switch lever 13 for driving the motor M via a positive line P of the motor drive circuit, and the negative male terminal 23n is connected to an FET for controlling the motor M via a negative line N of the motor drive circuit. The signal male terminal 23s is connected to an ON/OFF control terminal of the FET by a signal line S.

Figure 5A:
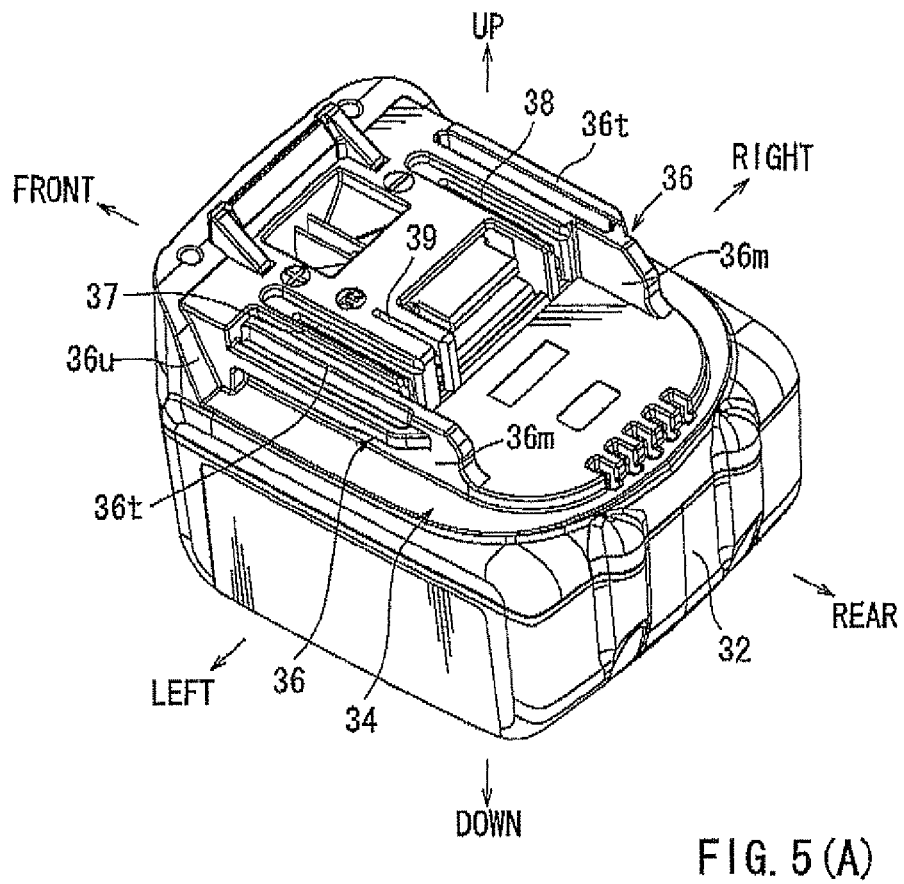
FIG. 5(A) is an overall perspective view of the battery pack.
Figure 5B:
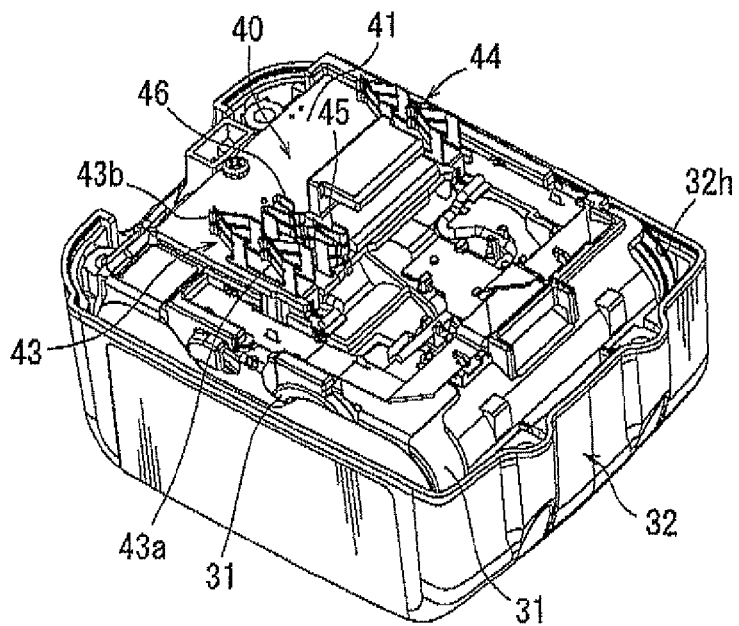
FIG. 5(B) is a perspective view of the battery pack with its cover portion removed.

As shown in FIG. 5B, the battery pack 30 is provided with an open-top case main body portion 32 accommodating a plurality of cells 31, and a cover portion 34 covering an opening 32h of the case main body portion 32. The case main body portion 32 and the cover portion 34 are formed substantially in a rectangular configuration, and the cover portion 34 is fastened to the case main body portion 32 by means of screws at a plurality of peripheral positions.

As shown in FIG. 5A, on the right and left side of the upper surface of the cover portion 34 of the battery pack 30, there are formed the slide rails 36 for connection with the electric power tool main body 10 so as to extend in the longitudinal direction. Each of the right and left slide rails 36 includes a rail main body portion 36m and the lateral ridge portion 36t protruding outwardly in the width direction by a predetermined length from the upper side surface of the rail main body portion 36m. And, as shown in FIG. 4, the right and left lateral ridge portions 36 can be fit-engaged with the right and left rectangular grooves 18m formed in the battery connection portion 17 of the electric power tool main body 10. Further, as shown in FIG. 5A, stopper portions 36u are formed at the proximal end portions (front end portions) of the right and left slide rails 36.

In the front portion of the upper surface of the cover portion 34 of the battery pack 30, there are formed, between the right and left slide rails 36, a left guide slit 37, a right guide slit 38, and an intermediate guide slit 39, so as to be parallel to the slide rails 36. In the course of sliding, the positive male terminal 23p, the negative male terminal 23n, and the signal male terminal 23s of the electric power tool main body 10 can be inserted through the left guide slit 37, the right guide slit 38, and the intermediate guide slit 39, respectively. Further, on the inner side of the left guide slit 37, there is arranged a positive female terminal 43 (See FIG. 5B) of the battery pack 30, and, on the inner side of the right guide slit 38, there is arranged a negative female terminal 44 of the battery pack 30. Further, on the inner side of the intermediate guide slit 39, there are arranged a charge female terminal 45 and a discharge control female terminal 46 side by side in the sliding direction. That is, the charge female terminal 45 is arranged on the rear end side (inlet side) of the intermediate guide slit 39, and the discharge control female terminal 46 is arranged on the front side of the charge female terminal 45 (i.e., on the depth side of the intermediate guide slit 39).

As shown in FIGS. 5A, 6, etc., a positive female terminal 43, a negative female terminal 44, a charge female terminal 45, and a discharge control female terminal 46 are fixed to a terminal portion 40 of the battery pack 30. The terminal portion 40 is a member for arranging the female terminals 43, 44, 45, and 46 at predetermined positions on the inner side of the cover portion 34. The terminal portion 40 is provided with a flat plate portion 41, on the upper surface of which the positive female terminal 43, the negative female terminal 44, the charge female terminal 45, and the discharge control female terminal 46 are arranged.

The positive female terminal 43 and the negative female terminal 44 have the same configuration, and both the terminals can pinch the positive male terminal 23p and the negative male terminal 23n of the electric power tool main body 10 from both sides in the thickness direction, thereby connected to the male terminals 23p and 23n. More specifically, the positive terminal 43 is provided with a first pinching portion 43a and a second pinching portion 43b arranged in the sliding direction, and the first pinching portion 43a and the second pinching portion 43b are conductors in the form of a plate spring. Here, the first pinching portion 43a and the second pinching portion 43b are maintained in a state in which they electrically conductive with each other. And in the course of sliding, the positive male terminal 23p of the electric power tool main body 10 is guided by the left guide slit 37 of the battery pack 30 to be inserted into the first pinching portion 43a and the second pinching portion 43b of the positive female terminal 43, whereby the positive male terminal 23p of the electric power tool main body 10 and the positive female terminal 43 of the battery pack 30 are electrically connected to each other.

Since the negative female terminal 44 is of the same configuration as the positive female terminal 43, a description thereof will be omitted.

As shown in FIG. 1A, the positive female terminal 43 of the battery pack 30 is connected to positive electrodes of the cells 31 via the positive line P. The negative female terminal 44 is connected to negative electrodes of the cells 31 via the negative line N.

Figure 1B:
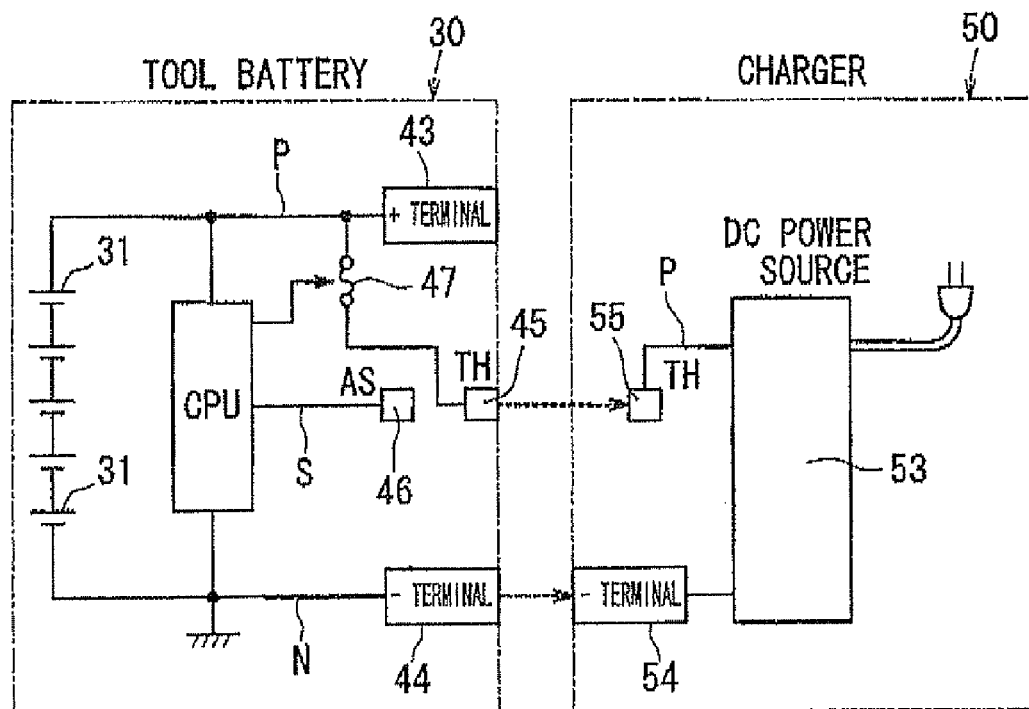
FIG. 1(B) is an electric circuit diagram showing a connecting structure of the battery pack and a battery charger.

As shown in FIG. 1B, the charge female terminal 45 of the battery pack 30 is a terminal to which a positive male terminal 55 of a battery charger 50 described below is connected, and is connected to the positive electrodes of the cells 31 via a circuit switch portion 47 and the positive line P. As shown in FIG. 1A, the discharge control female terminal 46 of the battery pack 30 is a terminal to which the signal male terminal 23s of the electric power tool main body 10 is connected. It is connected to a discharge control output terminal of a CPU via the signal line S. Thus, when, for example, a discharge stop signal is output from the discharge control output terminal of the CPU at the time of overdischarge of the battery pack 30, the FET of the electric power tool main body 10 turns off to stop the motor M.

The charge female terminal 45 and the discharge control female terminal 46 have the same configuration, and, are provided symmetrically with respect to the sliding direction (the longitudinal direction), as shown in FIG. 6.

As shown in FIG. 6B etc., the discharge control female terminal 46 includes a left terminal piece 46a and a right terminal piece 46b that pinch the signal male terminal 23s of the electric power tool main body 10 from both sides in the thickness direction (lateral direction). The left terminal piece 46a and the right terminal piece 46b are conductors in the form of a spring plate. The distance between the left terminal piece 46a and the right terminal piece 46b is large on the front end side and the rear end side, and minimum at a halfway position 46c near the rear end. And, the signal male terminal 23s of the electric power tool main body 10 is configured to be pinched at the halfway position 46c and in the vicinity thereof. The distance dimension between the front end side and the rear end side of the discharge control female terminal 46 is set larger than the slit width of the intermediate guide slit 39.

The charge female terminal 45 is of the same construction as the discharge control female terminal 46. As shown in FIG. 6C, the signal male terminal 23s of the electric power tool main body 10 can slidably pass between the left terminal end 45a and the right terminal end 45b. Thus, in the course of sliding, the signal male terminal 23s of the electric power tool main body 10 is guided by the intermediate guide slit 39 to pass the charge female terminal 45, and is then guided to the position of the discharge control female terminal 46.

As shown in FIG. 6C, both ends in the sliding direction of the signal male terminal 23s of the electric power tool main body 10 are beveled into a wedge-like sectional configuration, so that, at the time of insertion, the signal terminal can smoothly pass the charge female terminal 45 to be inserted into the discharge control female terminal 46. Also when pulling the signal male terminal 23s of the electric power tool main body 10 out of the discharge control female terminal 46, it can smoothly pass the charge female terminal 45.

Figure 7:
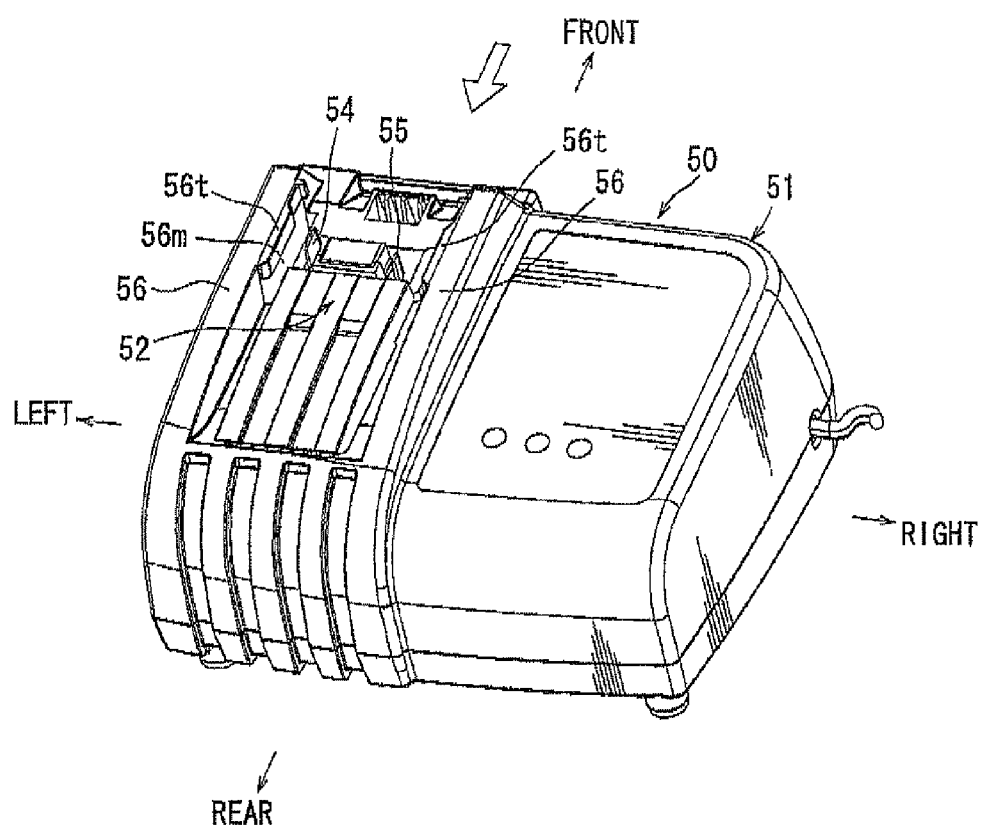
FIG. 7 is an overall perspective view of a battery charger.

As shown in FIG. 7, a battery charger 50 has a battery connection portion 52 provided on the left-hand side of a housing 51. In the battery connection portion 52, there are provided, on the right-hand and left-hand sides thereof, guide wall portions 56 extending in the longitudinal direction, and, at upper end positions of the opposing side walls of the right and left guide wall portions 56, there are formed ridge portions 56t in the form of a rail, which protrude inwardly in the width direction. That is, recesses 56m are formed under the ridge portions 56t. Further, the lateral ridge portions 36t of the battery pack 30 can be fit-engaged with the right and left recesses 561m of the battery charger 50.

Further, in the battery connection portion 52 of the battery charger 50, there are provided a negative male terminal 54 and a positive male terminal 55 between the right and left ridge portions 561 and at positions corresponding to the right guide slit 38 and the intermediate guide slit 39 of the battery pack 30. The negative male terminal 54 of the battery charger 50 has substantially the same configuration as the negative male terminal 23n of the electric power tool main body 10. The positive male terminal 55 of the battery charger 50 has substantially the same configuration as the signal male terminal 23s of the electric power tool main body 10, and is arranged at a position where it is connected to the charge female terminal 45 of the battery pack 30.

As shown in FIG. 1B, the positive male terminal 55 of the battery charger 50 is connected to the positive terminal of a DC power source 53 via the positive line P, and the negative male terminal 54 is connected to the negative terminal of the DC power source 53 via the negative line N.

As shown in FIGS. 3 and 4, in order to connect the battery pack 30 and the electric power tool main body 10 with each other, the front end portions of the rectangular grooves 18m provided in the battery connection portion 17 of the electric power tool main body 10 are fit-engaged with the lateral ridge portions 36t formed on the right and left slide rails 36 of the battery pack 30. Next, with the fit-engaged state maintained, the electric power tool main body 10 slides forwards with respect to the battery pack 30. As a result, the electric tool main body 10 and the battery pack 30 are connected with each other. Further, in the course of sliding, the positive male terminal 23p, the negative male terminal 23n, and the signal male terminal 23s of the electric power tool main body 10 are inserted into the left guide slit 37, the right guide slit 38, and the intermediate guide slit 39 of the battery pack 30, respectively. Further, the positive male terminal 23p and the negative male terminal 23n are respectively guided by the left guide slit 37 and the right guide slit 38 of the battery pack 30 to be inserted into the positive female terminal 43 and the negative female terminal 44. Further, the signal male terminal 23s of the electric power tool main body 10 slidably passes through the charge female terminal 45 while guided by the intermediate guide slit 39 to be inserted into the discharge control female terminal 46. And, at the stage where the forward sliding of the electric power tool main body 10 with respect to the battery pack 30 has been completed, the connection of the electric power tool main body 10 and the battery pack 30 is completed. As shown in FIG. 1A, the positive male terminal 23p, the negative male terminal 23n, and the signal male terminal 23s of the electric power tool main body 10 are connected to the positive female terminal 43, the negative female terminal 44, and the discharge control female terminal 46 of the battery pack 30, respectively.

When connecting the battery pack 30 to the battery charger 50, the battery pack 30 is held upside down, and in this state, the lateral ridge portions 36t formed on the right and left slide rails 36 of the battery pack 30 are fit-engaged with the right and left recesses 56m of the battery charger 50 from the front side. Next, with the fit-engaged state maintained, the battery pack 30 slides backwards with respect to the battery charger 50, as can be seen in FIG. 7. As a result, the battery pack 30 and the battery charger 50 are connected with each other. Further, in the course of sliding, the negative male terminal 54 of the battery charger 50 is inserted into the right guide slit 38 of the battery pack 30, and the positive male terminal 55 of the battery charger 50 is inserted into the intermediate guide slit 39 of the battery pack 30. Further, as shown in FIG. 1B, when a slide movement is completed, the negative male terminal 54 of the battery charger 50 is connected to the negative female terminal 44 of the battery pack 30, and the positive male terminal 55 of the battery charger 50 is connected to the charge female terminal 45 of the battery pack 30.

Thus, the battery pack 30 corresponds to one member of the present invention, and the battery charger 50 and the electric power tool main body 10 correspond to the other member of the present invention.

In the connecting terminal structure according to the embodiment, it is possible to arrange a plurality of terminals having different functions (the charge female terminal 45 and the discharge control female terminal 46) in the sliding direction in the battery pack 30. Thus, even when the number of terminals increases, there is no need to increase the size of the battery pack 30 in a direction perpendicular to the sliding direction, or, the width direction. Accordingly, it is possible to increase the number of terminals without having to increase the width of the battery pack 30.

Further, since the width of the battery pack 30 does not increase, the width of the battery connection portion of the electric power tool main body 10 and of the battery charger 50, to which the battery pack 30 is connected, does not increase, either.

Further, the signal male terminal 23s of the electric power tool main body 10 is formed in the form of a flat plate, which are parallel to the sliding direction, and both ends in the sliding direction of the male terminal are beveled into a substantially wedge-like sectional configuration. Thus, in the course of sliding, the signal male terminal 23s can be easily inserted into and pulled out of the charge female terminal 45 and the discharge control female terminal 46 of the battery pack 30.

Figure 8A:
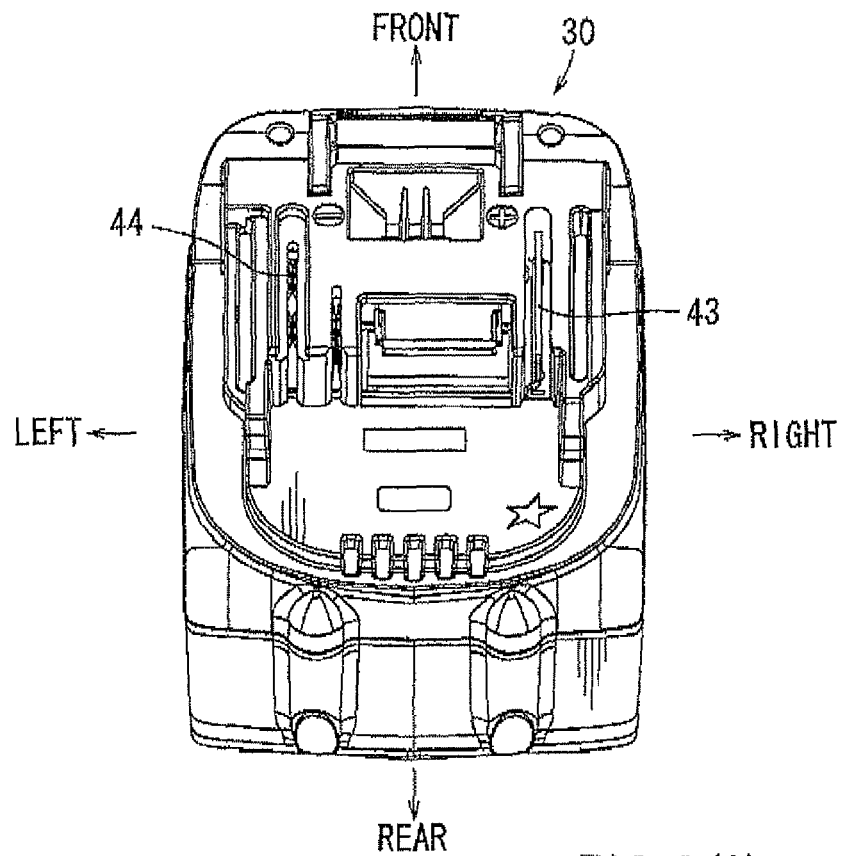
FIG. 8(A) is an overall perspective view of a battery pack according to a modification.
Figure 8B:
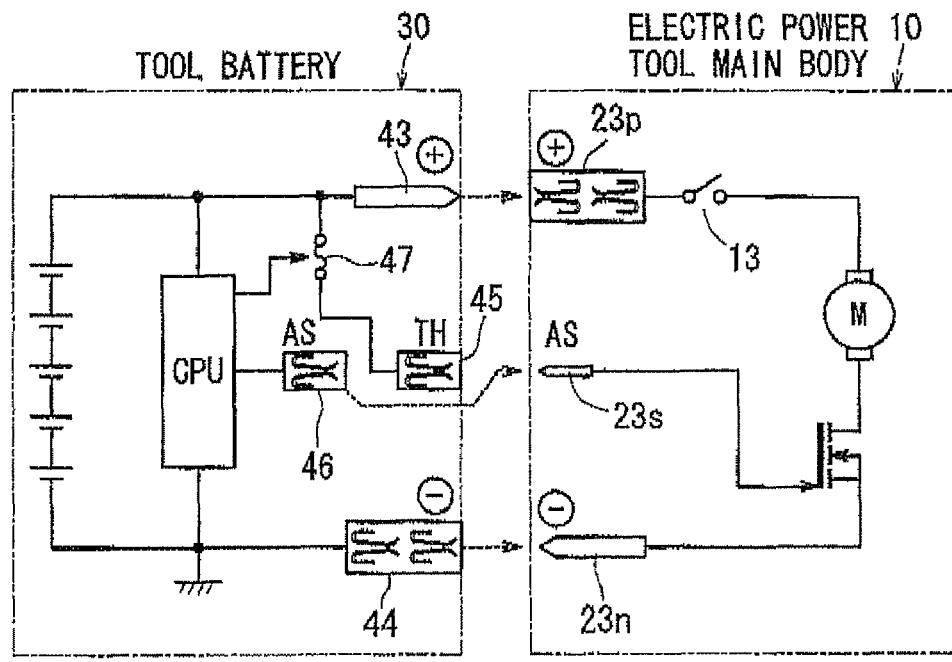
FIG. 8(B) is an electric circuit diagram showing a connecting structure of the battery pack and an electric power tool main body.

The present invention is not restricted to the above-described embodiment but allows modification without departing from the subject matter of the invention. For example, in the above embodiment, the male terminals 23p and 23n are provided on the electric power tool main body 10 side, and the female terminals 43 and 44 are provided on the battery pack 30 side. However, as shown in FIGS. 8A and 8B, the positive terminal 43 of the battery pack 30, which is a high voltage side terminal, may be formed as a male terminal, and the positive terminal 23p of the electric power tool main body 10, which is a low voltage side terminal, may be formed as a female terminal. In this way, the terminal, which is for higher voltage and more subject to temperature rise, is formed as a male terminal in the form of a flat plate, whereby it is possible to obtain a superior heat dissipation property and to suppress an increase in the temperature of the terminal. Further, in the above explanation, the positive terminal has the same configuration as the negative terminal, but the negative terminal may be configured such that the negative terminal in the battery pack and the corresponding negative terminal in the electric power tool main body 10 are connected with each other before the positive terminals are connected, which can avoid an unnecessary electric spark which could occur in case the positive terminals are connected before the negative terminals are connected.

Figure 9A:
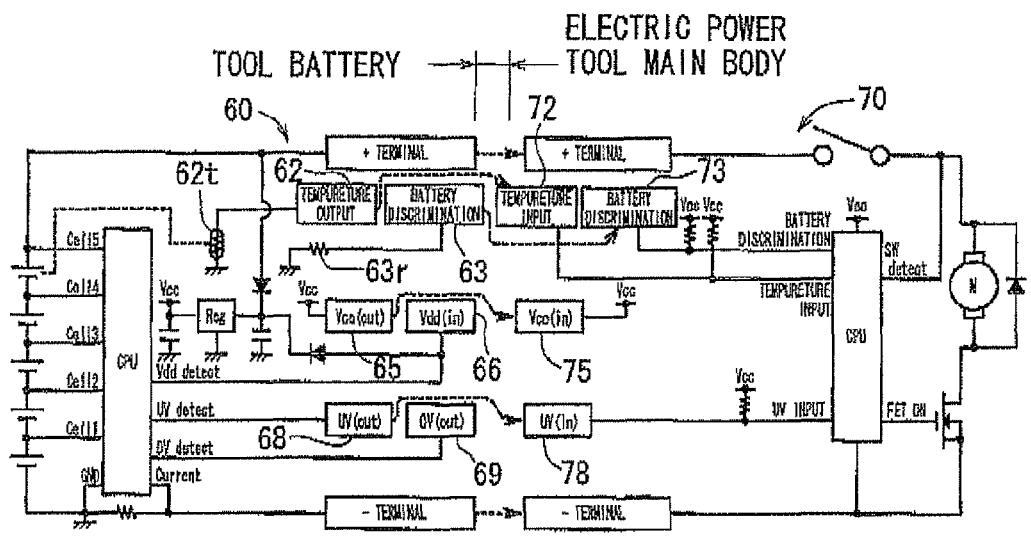
FIG. 9(A) is an electric circuit diagram showing a connecting structure of the battery pack and the electric power tool main body of the modification.
Figure 9B:
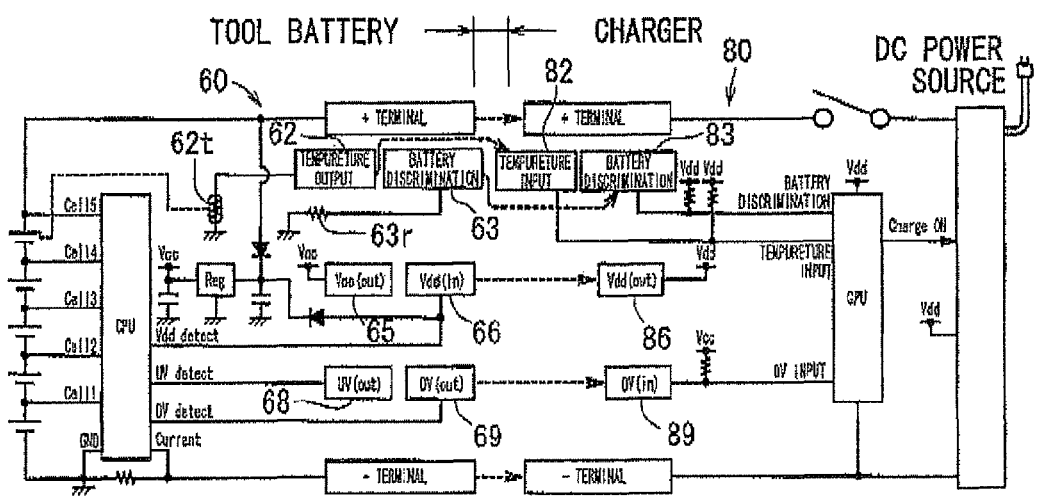
FIG. 9(B) is an electric circuit diagram showing a connecting structure of the battery pack and a battery charger.
Figure 10:
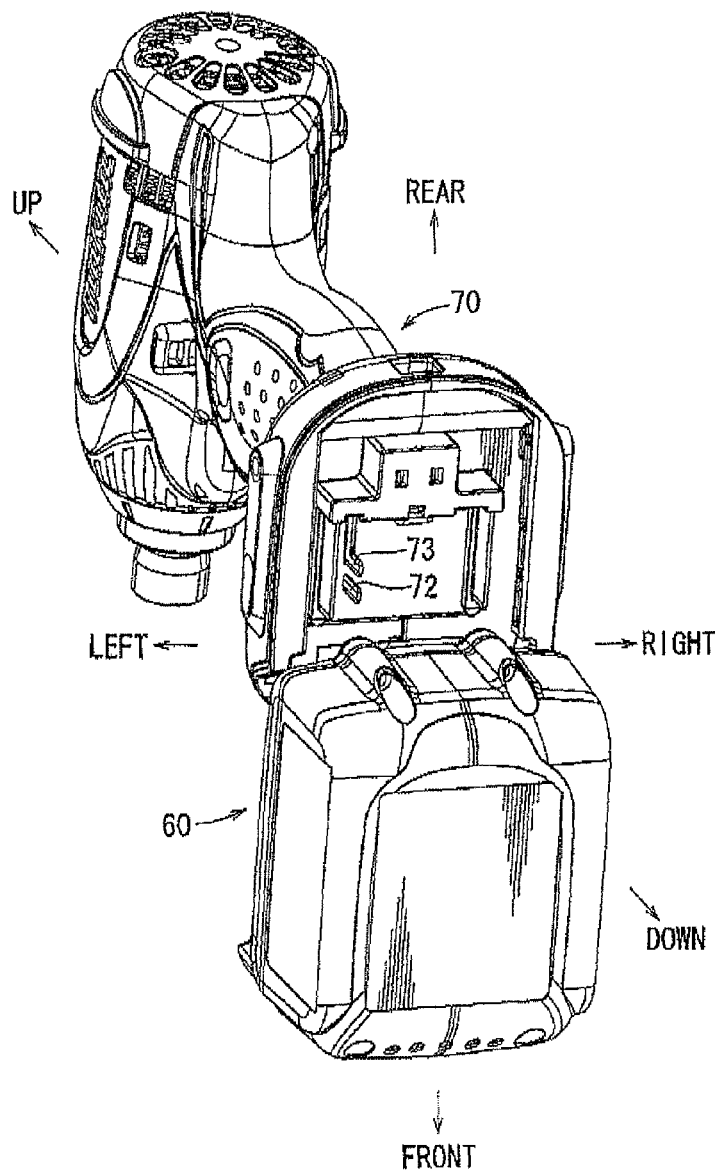
FIG. 10(A) is a perspective view as seen from below of the battery connection portion of the electric power tool main body of the modification.
FIG. 10(B) is a plan view showing a process for connection between a temperature input male terminal of the electric power tool main body and a temperature output female terminal of the battery pack, and for connection between a battery discrimination male terminal of the electric power tool main body and a battery discrimination female terminal of the battery pack.
Figure 10:
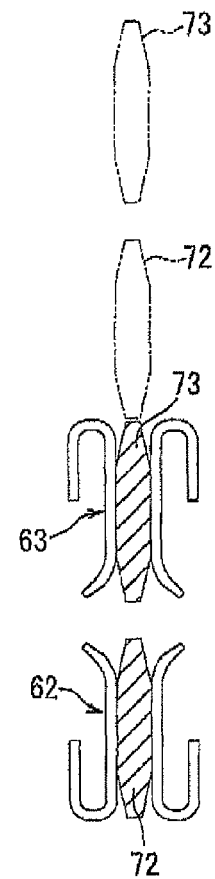

Further, in this embodiment, the charge female terminal 45 and the discharge control female terminal 46 are arranged on the battery pack 30 side by side in the sliding direction, and the positive male terminal 55 of the battery charger 50 is connected to the charge female terminal 45, with the signal male terminal 23s of the electric power tool main body 10 being connected to the discharge control female terminal 46. However, as shown in FIGS. 9A and 9B, in a battery pack 60 provided with a temperature output female terminal 62 and a battery discrimination female terminal 63 may be arranged side by side in the sliding direction. Here, the temperature output female terminal 62 is connected to a thermometer 62t detecting the cell temperature, and the battery discrimination female terminal 63 is connected to a resistor 63r showing a battery type.

As shown in FIGS. 9A and 10A, an electric power tool main, body 70, to which the battery pack 60 is connected, is provided with a temperature input male terminal 72 and a battery discrimination female terminal 73, which correspond to the temperature output female terminal 62 and the battery discrimination female terminal 63 of the battery pack 30 and which are arranged side by side in the sliding direction. And, as shown in FIG. 10B, in the course of sliding, the temperature input male terminal 72 and the battery discrimination female terminal 73 of the electric power tool main body 70 are respectively connected to the temperature output female terminal 62 and the battery discrimination female terminal 63 of the battery pack 60.

Figure 11:
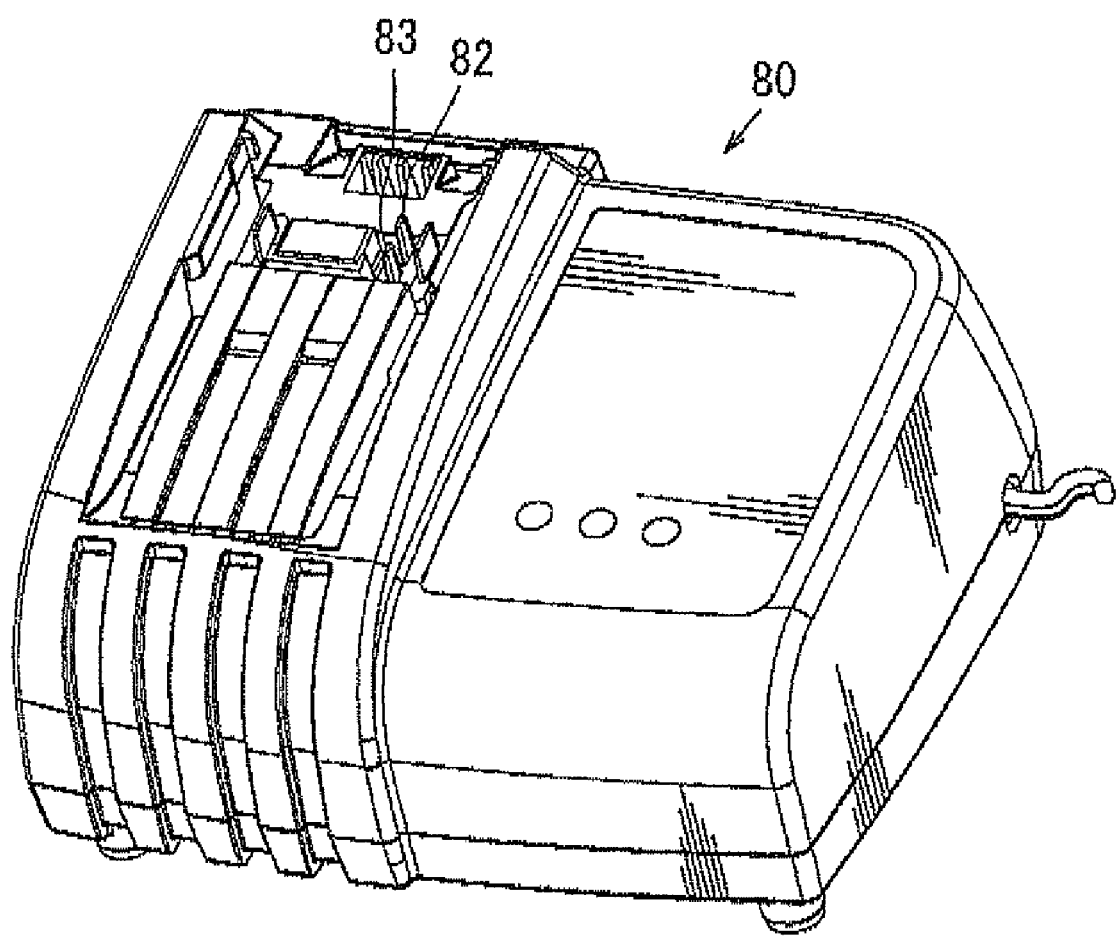
FIG. 11 is an overall perspective view of a battery charger according to the modification.
Figure 12:
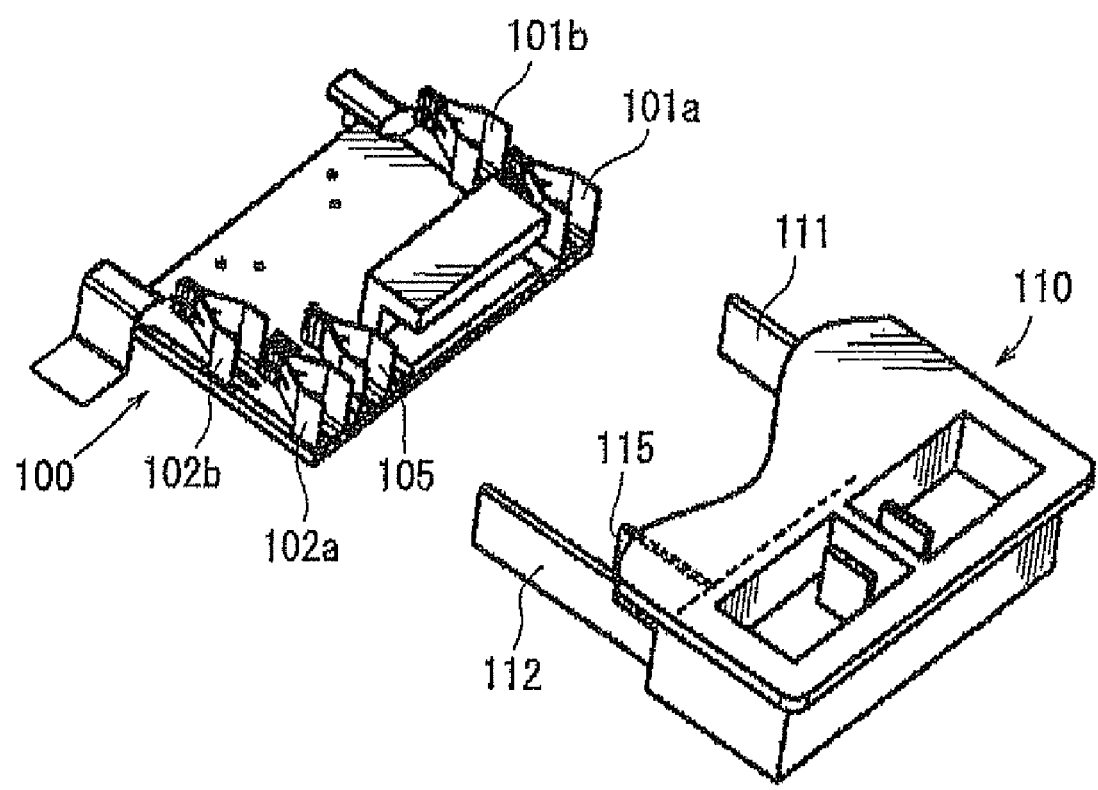
FIG. 12 is a perspective view showing a prior art in which a terminal portion of a battery pack and a terminal portion of an electric power fool main body.

Similarly, as shown in FIGS. 9B and 11, a battery charger 80, to which the battery pack 60 is connected, is provided with a temperature input male terminal 82 and a battery discrimination female terminal 83 which correspond to the temperature output female terminal 62 and the battery discrimination female terminal 63 of the battery pack 30 and which are arranged side by side in the sliding direction. And, in the course of sliding, the temperature input male terminal 82 and the battery discrimination female terminal 83 of the battery charger 80 are respectively connected to the temperature output female terminal 62 and the battery discrimination female terminal 63 of the battery pack 60.

As shown in FIGS. 9A and 9B, in the case of a battery pack 60 provided with a control voltage output female terminal 65 and a control voltage input female terminal 66, the control voltage output female terminal 65 and the control voltage input female terminal 66 can be arranged side by side in the sliding direction. In this case, a control voltage input male terminal 75 of the electric power tool main body 70 is connected to the control voltage output female terminal 65, and a control voltage output male terminal 86 of the battery charger 80 is connected to the control voltage input female terminal 66.

Further, as shown in FIGS. 9A and 9B, in the case of a battery pack 60 provided with an overdischarge output female terminal 68 and an overcharge output female terminal 69, the overdischarge output female terminal 68 and the overcharge output female terminal 69 can be arranged side by side in the sliding direction. In this case, an overdischarge input male terminal 78 of the electric power tool main body 70 is connected to the overdischarge output female terminal 68, and an overcharge input male terminal 89 of the battery charger 80 is connected to the overcharge output female terminal 69.

In the embodiment described above, in the course of connecting a predetermined male terminal to a predetermined female terminal, the predetermined male terminal passes through the female terminal while in contact with another female terminal. However, it is also possible to make the heights of a predetermined female terminal and of another female terminal, which are arranged side by side in the sliding direction, different from each other, allowing a predetermined male terminal to pass through the other female terminal in a non-contact state.

Further, in the embodiment described above, the electric power tool main body 10, 70 and the battery charger 50, 80 are used by way of example as the electric apparatus. It is also possible to use a battery checker etc. as the electric apparatus.

We claim:

1. A connecting structure of electrical terminals for establishing electrical contact between a battery pack and an electric apparatus by sliding attachment of the battery pack to the electric apparatus, the structure comprising:
   a plurality of terminals having different functions arranged in the sliding direction in one of the battery pack and the electric apparatus; and
   at least one terminal provided in the other one of the battery pack and the electric apparatus, the at least one terminal being connected with a corresponding terminal in the one of the battery pack and the electric apparatus;
   wherein before the at least one terminal reaches the corresponding terminal during the sliding, the at least one terminal can pass through another terminal provided in the one of the battery pack and the electric apparatus.

2. The connecting structure according to claim 1, wherein a single terminal is provided in the other one of the battery pack and the electric apparatus to be connected to one of the plurality of terminals in the one of the battery pack and the electric apparatus, or a plurality of terminals are provided in the other one of the battery pack and the electric apparatus that are arranged in the sliding direction to be respectively connected to the plurality of terminals in the one of the battery pack and the electric apparatus.

3. The connecting structure according to claim 1, wherein one of the plurality of terminals arranged in the sliding direction is for transmitting a battery pack identification signal.

4. The connecting structure according to claim 1, wherein one of the plurality of terminals arranged in the sliding direction is for supplying charge current, and the other terminal is for transmitting a discharge control signal.

5. The connecting structure according to claim 1, wherein the terminal in the other one of the battery pack and the electric apparatus is a male terminal in the form of a flat plate parallel to the sliding direction, with both ends in the sliding direction of the male terminal being beveled substantially in the form of a wedge.

6. The connecting structure according to claim 1, wherein the terminals in the one of the battery pack and the electric apparatus are female terminals formed so as to hold the male terminal from both sides, with an open-end portion of the female terminal being larger than the width of a slit that guides the male terminal.

7. The connecting structure according to claim 6, wherein the heights of a predetermined female terminal and the other female terminal arranged in the sliding direction are configured to be different from each other such that the male terminal can pass through the other female terminal in a con-contact state during the sliding.

8. The connecting structure according to claim 1, wherein the battery pack further includes a positive terminal and a negative terminal for supplying current to the electric apparatus, the positive and negative terminals being formed as a male and a female terminal, respectively.

9. The connecting structure according to claim 1, wherein the electric apparatus is selected from a group consisting of electrical power tools and battery chargers.

10. A combination of connecting terminals for establishing electrical contact between a battery pack and an electric apparatus through relative sliding movement therebetween, comprising:
    a plurality of terminals provided in the battery pack, the terminals having different functions and arranged in the sliding direction; and
    at least one terminal provided in the electric apparatus, the at least one terminal being connected with a corresponding terminal in the battery pack;
    wherein before the at least one terminal reaches the corresponding terminal, the at least terminal in the electric apparatus can pass through another terminal in the battery pack.

11. The combination according to claim 10, wherein a plurality of terminals are provided in the electric apparatus in the sliding direction to be respectively connected to the plurality of terminals in the battery pack.

12. The combination according to claim 10, wherein one of the plurality of terminals in the battery pack is for transmitting a battery pack identification signal.

13. The combination according to claim 10, wherein one of the plurality of terminals in the battery pack is for supplying charge current, and the other terminal is for transmitting a discharge control signal.

14. The combination according to claim 10, wherein the terminal in the electric apparatus is a male terminal in the form of a flat plate parallel to the sliding direction, with both ends being beveled in the form of a wedge.

15. The combination according to claim 10, wherein the terminals in the battery pack are female terminals formed so as to hold the male terminal from both sides, with an open-end portion of the female terminal being larger than the width of a slit that guides the male terminal.

16. The combination according to claim 10, wherein the electric apparatus is selected from a group consisting of electrical power tools and battery chargers.

\* \* \* \* \*

UNITED STATES PATENT AND TRADEMARK OFFICE
CERTIFICATE OF CORRECTION

PATENT NO. : 8,282,413 B2
APPLICATION NO. : 13/082989
DATED : October 9, 2012
INVENTOR(S) : Masaaki Fukumoto et al.

It is certified that error appears in the above-identified patent and that said Letters Patent is hereby corrected as shown below:

Claim 7, column 11, lines 34 and 35, please change "con-contact state" to --non-contact state--.

Signed and Sealed this
Fifteenth Day of January, 2013

David J. Kappos
*Director of the United States Patent and Trademark Office*